United States Patent
Staehlin et al.

[15] 3,640,168
[45] Feb. 8, 1972

[54] ELECTRICALLY PRECISE SLOTTED WAVEGUIDE

[72] Inventors: John H. Staehlin, Baltimore; Gilbert A. Peon, Greenbelt, both of Md.

[73] Assignee: The United States of America as represented by the Secretary of the Air Force

[22] Filed: Aug. 7, 1970

[21] Appl. No.: 61,887

[52] U.S. Cl..................................83/444, 29/600, 83/522, 83/926 R
[51] Int. Cl.........................................................B26d 7/16
[58] Field of Search...................83/444, 522, 926 R; 29/600

[56] References Cited

UNITED STATES PATENTS

| | | | |
|---|---|---|---|
| 3,162,081 | 12/1964 | Gates, Jr. | 83/522 X |
| 3,287,672 | 11/1966 | Heinz | 29/600 X |
| 3,349,479 | 10/1967 | Sewell | 29/600 |

*Primary Examiner*—Frank T. Yost
*Attorney*—Harry A. Herbert, Jr. and George Fine

[57] ABSTRACT

A waveguide-slotting apparatus having continuous slotting of radiating elements in standard rectangular extrusions or drawn tubing which are precisely located electrically.

3 Claims, 1 Drawing Figure

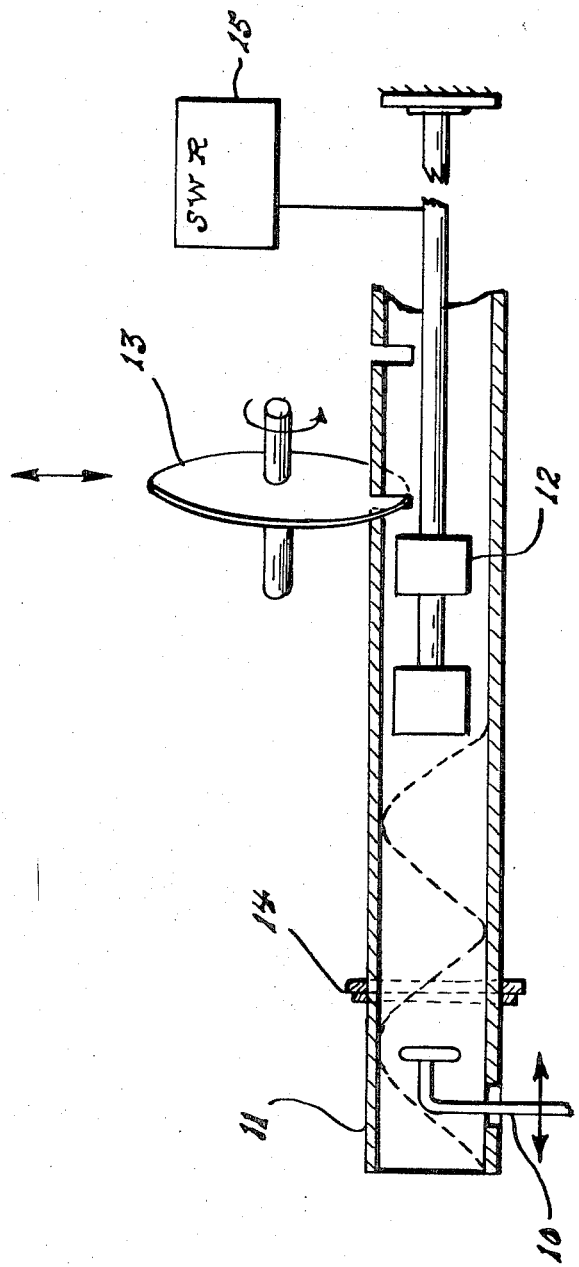

ELECTRICALLY PRECISE SLOTTED WAVEGUIDE

BACKGROUND OF THE INVENTION

This invention relates broadly to a waveguide-slotting apparatus and in particular to an improved highly precision slotting apparatus for accurately locating radiating elements at the null points of a standing wave along a waveguide.

With the increased use of edge-slotted waveguide arrays such as the low-sidelobe Overland Radar design, a source of more precise rectangular tubing was required to eliminate changes in waveguide wavelength characteristics which are caused by dimensional variations in the waveguide. The most precise type of waveguide is drawn tubing, however, ideally the radiators of an array would be fabricated from extrusions which are configured with integral appendages for attaching adjacent elements to form a composite beam structure. Since the extrusion cannot be made to the same precision with which tubing can be drawn, a compromise must be reached. Thus, a compromise between the electrical precision of the drawn tubing and the increased structural integrity of an array using the extrusions must be accomplished. This prior art compromise would be eliminated if there were a method available for compensating for the deviations in the height of the waveguide extrusions which would permit the use of substantially less precise extrusions.

One prior art technique which has been utilized for slotting waveguides is monitoring the size of each waveguide over its entire length and altering the slot spacings accordingly. This technique requires many measurements and calculations in order to determine a new spacing for each slot. This technique would also require that the table of machine which is doing the slotting have a long travel bed and, or alternatively, that successive setups will be necessary to do long waveguide lengths. This prior art method of precision slotting waveguides requires a rather lengthy machine bed and precise travel of the machine bed. These requirements dictate the use of highly expensive and complicated machine beds which greatly increase the costs of waveguide slotting.

SUMMARY OF THE INVENTION

The present invention utilizes a sliding short with a column support substantially longer than the longest part of the waveguide which is to be slotted. A standing-wave ratio meter assembly is utilized in conjunction with the sliding short to provide a precise measurement of the electrical nulls in the uncut section of the waveguide. Once the precise of location of the null is located within the waveguide, a slotting device operates in conjunction with guides to obtain a precise alignment of the waveguide extrusion during the advancement and cutting operations.

It is one object of the invention, therefore, to provide an improved waveguide-slotting apparatus utilizing drawn tubing for the waveguide which is the most precise form.

It is another object of the invention to provide an improved waveguide-slotting apparatus which automatically compensates for variation in waveguide size.

It is still another object of the invention to provide an improved waveguide-slotting apparatus utilizing electrical measurements of the waveguide wavelength to precisely locate the slot.

It is yet another object of the invention to provide an improved waveguide-slotting apparatus having continuous slotting of electrically precise radiating elements from standard rectangular extrusions.

These and other advantages, features and objects of the invention will become more apparent from the following description taken in connection with the illustrative embodiment in the accompanying drawing, wherein the FIGURE is an elevational view partly in section of the waveguide-slotting apparatus in accordance with this invention.

DETAILED DESCRIPTION OF THE PREFERRED EMBODIMENT

Referring now to the FIGURE, there is shown a waveguide-slotting apparatus utilizing an RF source 10 which is mounted in one end of the rectangular waveguide tube 11 or extrusion to provide an RF signal and a sliding short 12 which is inserted into the other open end of the tube 11 to detect the RF signal. The sliding short 12 is shown having a support column substantially longer than the longest part of the rectangular tubing 11 which is to be slotted. A standing-wave ratio meter assembly 15 is utilized for the precise measurement of the electrical nulls in the uncut section of the waveguide. A slot-cutting device 13 is mounted above the rectangular tubing 11 and is in a fixed relationship with respect to the sliding short 12. The slot-cutting device 13 may be a rotating circular saw which is mounted perpendicular to the waveguide 11 and is movable in the perpendicular direction. A tubing guide 14 which is an axial alignment with the rectangular tube 11 is provided to obtain a precise axial alignment of the rectangular tube 11 (waveguide extrusion) with the sliding short 12 during the advancement and cutting operations. A better understanding of the present invention may be had by describing the operations involved in slotting a waveguide having a length in the range of 15 to 25 feet. The unsupported length of the sliding short column 12 is extended to a length substantially greater than 25 feet and then locked in place. The free end of the extrusion 11 is guided over the sliding short 12 and inserted between the guide rollers 14. The standing-wave ratio (SWR) meter 15 may be clamped to the free end of the waveguide extrusion or may be placed upon a table or bench along the side of waveguide tube 11. The waveguide tube 11 is moved with respect to the stationary sliding short 12 until a null reading is obtained on the SWR meter 15. The slotting device 13 is set to the proper angle and the first slot is cut in the section of the waveguide 11 which has passed over the sliding short 12 toward the support member. Thus, a section of the waveguide 11 having a length equal to $N\lambda g/2$ which has not been slotted is left between the sliding short 12 and the SWR meter 15. The character $N$ is some integer and $\lambda_o$ is the particular waveguide wavelength for the specific frequency which is being utilized. When the slot is completed, the waveguide 11 is advanced through the guides 14 along the sliding short 12 for a distance of approximately $\lambda_o/2$. Then the fine adjustment of the position is made by using the SWR meter 15 reading of the new electrical null.

When the angle of the second slot is set, the second slot is cut. This procedure is repeated until the entire length of the waveguide 11 has been slotted. The significant feature of this method of slotting a waveguide is the accuracy which is maintained throughout the entire cutting process. Since the SWR detector is fixed with respect to the waveguide, the same reference is utilized for the cutting of all the slots. Thus there is absolutely no error buildup which has been a problem in the prior art in slotting long sections of waveguides. The present invention electrically determines the positions of the slots by successively locating the null points of the standing wave along the waveguide's length. The accuracy which can be expected in locating the exact null position will depend upon the depth of the null, the sensitivity of the SWR meter and the stability of the RF source. Therefore, the use of a 40-db. choke-type short which is readily fabricated, will provide deep enough nulls 30 feet away from the detector in a 2-db/100-foot lossy waveguide with the accuracy being substantially constant along the entire waveguide length. The degree of accuracy to which the radiating elements can be machined is directly dependent upon the sensitivity of the meter and the stability of the RF source. Thus, a waveguide-slotting apparatus has been described which allows a continuous slotting of electrically precise radiating elements from standard rectangular extrusions or drawn tubing. This apparatus may be utilized for all sizes of waveguides and thus eliminates the need for long and precise machine tool bed travel. The present apparatus may also utilize multiple low-cost machine tools to perform the slotting operation.

Although the invention has been described with reference to a particular embodiment, it will be understood to those skilled in the art that the invention is capable of a variety of alternative embodiments within the spirit and scope of the appended claims.

We claim:

1. An electrically precise waveguide-slotting apparatus for cutting radiating elements in a rectangular extrusion comprising in combination:

an RF source mounted in one end of said rectangular extrusion to provide an RF signal, said RF signal providing electrical nulls within said rectangular extrusion;

a sliding short to detect said RF signal, said sliding short having a column support which is substantially longer than the rectangular extrusion to be slotted, said rectangular extrusion being inserted over said sliding short;

a standing-wave ratio meter connected to said sliding short for the precise measurement of the said electrical nulls;

a guide to position said rectangular extrusion with said sliding short to obtain a precise axial alignment of the said rectangular extrusion during the advancement and cutting operations, said rectangular extrusion being freely movable with respect to said sliding short; and a means for slotting said rectangular extrusion which is mounted above said rectangular extrusion in a fixed relationship with respect to said sliding short.

2. A waveguide-slotting apparatus as described in claim 1 wherein said slotting means comprises:

a rotating circular saw mounted perpendicular to said rectangular extrusion, said saw being movable in said perpendicular direction.

3. A waveguide-slotting apparatus as described in claim 1 wherein said sliding short comprises a 40-db. choke-type short.

* * * * *